US007000093B2

(12) United States Patent
Mates

(10) Patent No.: US 7,000,093 B2
(45) Date of Patent: Feb. 14, 2006

(54) CELLULAR AUTOMATON PROCESSING MICROPROCESSOR PREFETCHING DATA IN NEIGHBORHOOD BUFFER

(75) Inventor: John W. Mates, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 10/028,859

(22) Filed: Dec. 19, 2001

(65) Prior Publication Data

US 2003/0115021 A1   Jun. 19, 2003

(51) Int. Cl.
*G06F 17/16* (2006.01)
(52) U.S. Cl. ............................................. 712/36; 712/8
(58) Field of Classification Search ................. 712/10, 712/36, 8; 382/308
See application file for complete search history.

(56) References Cited

U.S. PATENT DOCUMENTS

| | | | | |
|---|---|---|---|---|
| 4,545,068 A | * | 10/1985 | Tabata et al. ............... | 382/307 |
| 5,159,690 A | * | 10/1992 | Margolus et al. ............ | 712/17 |
| 5,365,589 A |   | 11/1994 | Gutowitz ..................... | 380/43 |
| 5,371,865 A | * | 12/1994 | Aikawa et al. .............. | 711/125 |
| 5,432,718 A |   | 7/1995  | Molvig et al. ............... | 702/9 |
| 5,694,488 A | * | 12/1997 | Hartmann .................... | 382/210 |
| 5,748,178 A | * | 5/1998  | Drewry ....................... | 345/643 |
| 6,608,942 B1 | * | 8/2003 | Le ............................. | 382/279 |
| 6,614,556 B1 | * | 9/2003 | Hong et al. ................. | 358/3.03 |
| 2002/0029145 A1 | * | 3/2002 | Miranda ..................... | 704/258 |

* cited by examiner

*Primary Examiner*—Kenneth S. Kim
(74) *Attorney, Agent, or Firm*—Cynthia T. Faatz

(57) ABSTRACT

A cellular automaton cache memory architecture. On a micro-processor that is also capable of executing general-purpose instructions, a cache memory is provided to store instructions and data for use by the processor. The cache memory is further capable of storing data representing a first state of a cellular automaton at a first time step, where the data is organized in cells. A cellular automaton prefetch unit prefetches data associated with a cell to be updated and a neighborhood buffer stores the prefetched data. A cellular automaton update unit provides data from the neighborhood buffer to an update engine. The update engine includes a microprocessor execution unit capable of executing at least some general purpose microprocessor instructions and updates at least some of the selected cells according to an update rule and a state of any associated neighborhood cells to provide a state of the cellular automaton at a second time step. For one aspect, the memory, the update unit and the update engine are implemented on a single micro-processor integrated circuit chip.

25 Claims, 5 Drawing Sheets

FIG. 5

CELLULAR AUTOMATON PROCESSING MICROPROCESSOR PREFETCHING DATA IN NEIGHBORHOOD BUFFER

BACKGROUND

1. Field

An embodiment of the present invention relates to the field of integrated circuit devices and methods and, more particularly, to a method and apparatus for implementing a cellular automaton on an integrated circuit device such as a microprocessor.

2. Discussion of Related Art

A cellular automaton (CA) is a discrete dynamical system with a behavior that is specified in terms of local relationships. For example, the cells of a particular cellular automaton may be arranged in regular spatial lattice. Each cell in the lattice may include one or more bits of data. At each discrete time step, each of the cells of the cellular automaton computes its new state based on its own state and/or the states of neighboring cells at the previous time step. All cells in the lattice are updated synchronously at each time step according to given update rules that are typically simple, local and discrete.

Cellular automata (CAs) were introduced in the 1940s by John von Neumann and Stanislaw Ulam and popularized by John Horton Conway in the 1960s with his development of the "Game of Life." Cellular automata were developed as simple models to study, for example, biological processes.

CAs may be useful for a variety of purposes including image processing and generation, simulations of biological, chemical and/or physical processes, encryption/decryption, audio processing, etc.

For some applications, large computer systems and/or special purpose hardware developed particularly for CAs may be used to run CA applications. Such large computer systems and/or special purpose hardware may not be practical and/or accessible for many commonly used CAs or applications that may benefit from CA-type computations.

BRIEF DESCRIPTION OF THE DRAWINGS

The present invention is illustrated by way of example and not limitation in the figures of the accompanying drawings in which like references indicate similar elements, and in which:

FIG. 5 illustrates a rasterized portion of the lattice of FIG. 4 including a cell to be updated and its respective neighborhood cells.

DETAILED DESCRIPTION

A cellular automaton cache method and apparatus is described. In the following description, particular types of integrated circuits, memory configurations and architectures, for example are described for purposes of illustration. It will be appreciated, however, that other embodiments are applicable to other types of integrated circuits, and to memories and/or integrated circuit architectures configured in another manner.

For one embodiment, a general-purpose processor includes a cache memory to store instructions and data for use by the processor. The cache memory is further capable of storing data representing a first state of a cellular automaton at a first time step where the data is organized in cells. A first update engine is also included along with a cellular automaton update unit to provide data from selected cells of the cellular automaton to the first update engine. The first update engine updates at least some of the selected cells according to an update rule and a state of any associated neighborhood cells to provide a state of the cellular automaton at a second time step.

For one embodiment, this update engine is implemented using one or more general-purpose execution units. For some embodiments, multiple update engines are pipelined such that cellular automaton data may be updated for multiple generations before being written back.

Further details of this and other embodiments are provided in the description that follows.

Figure 1:
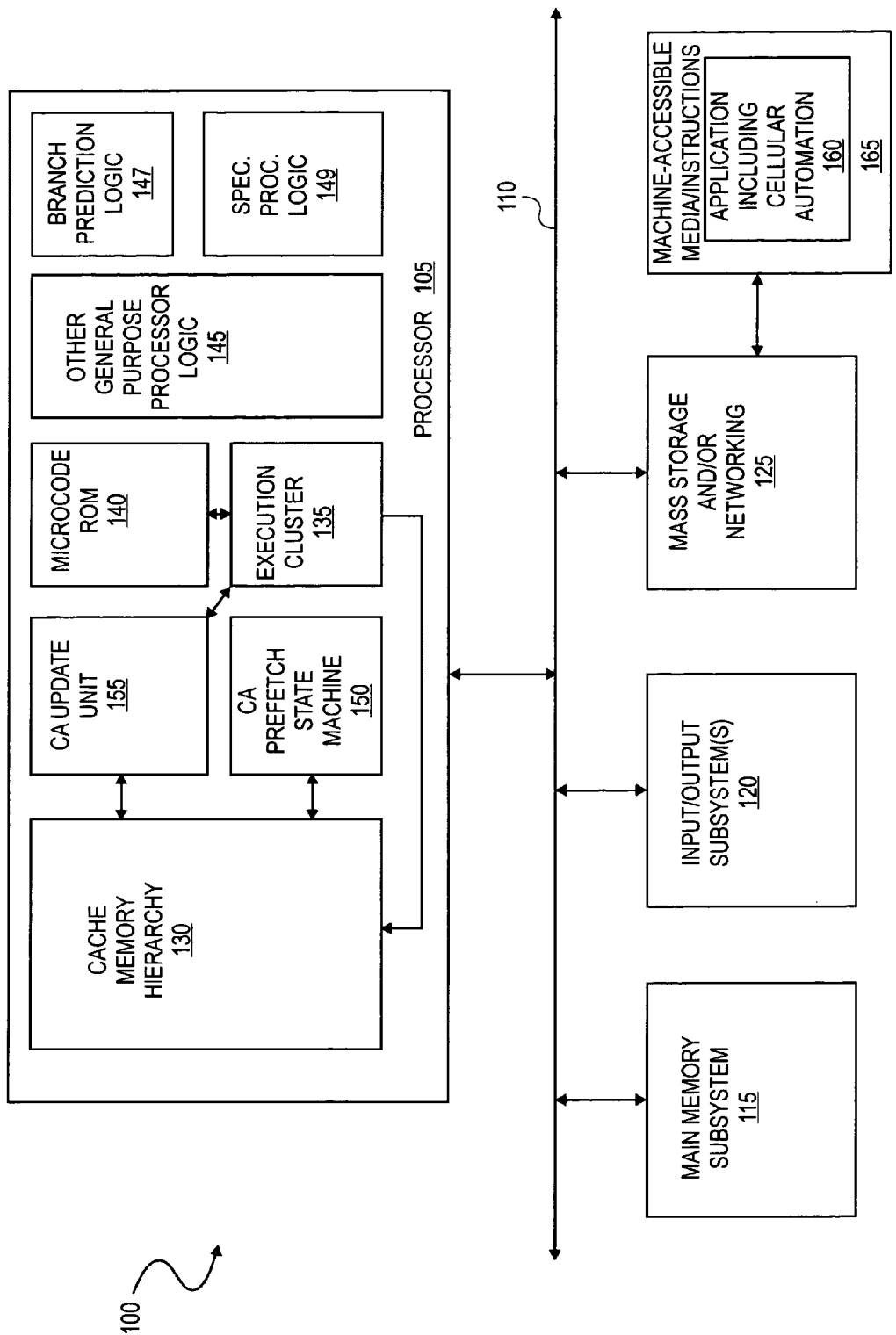
FIG. 1 is a block diagram showing a computer system of one embodiment that advantageously includes a processor having a cellular automaton-capable architecture.

FIG. 1 is a high-level block diagram of a computer system 100 that may be advantageously used to execute cellular automaton algorithms. For one embodiment, the computer system is a workstation, however, other types of computer and/or computing systems are within the scope of various embodiments. The computer system 100 includes a processor 105 coupled to a bus 110 to communicate information between the processor 105 and other components of the system 100. Also coupled to the bus 110 is a main memory subsystem 115, which may include, for example, main memory and a memory controller, one or more input and/or output subsystem(s) 120, and mass storage and/or networking hardware 125.

The input and/or output subsystem(s) 120 may include, for example, a keyboard, cursor control device, monitor, printer and/or other input and/or output devices and related buses and logic to provide for communication between the computer system 100 and a user, for example. The mass storage and/or networking hardware 125 may include, for example, a mass storage unit such as a CD-ROM, optical and/or hard disk drive and/or networking hardware to provide, for example, a connection to a local or wide area network such as the Internet.

For one embodiment, the processor 105 is a general-purpose microprocessor capable of executing widely available applications and operating system software such as, for example, Windows®-based applications and operating systems. (Windows is a registered trademark of Microsoft Corporation.) The processor 105 may alternatively or additionally be capable of executing other types of applications on other types of operating systems. For another embodiment, the processor 105 is a different type of processor, such as, for example, an embedded processor or a digital signal processor, that is also useful for applications other than cellular automaton-based applications.

The processor 105 of this embodiment includes a cache memory hierarchy 130 (i.e. at least two levels of cache memory), an execution cluster 135, which may also be referred to as an update engine or update engine pipeline, microcode read-only memory (ROM) 140 and other general purpose processor logic 145, such as, for example, an instruction fetch unit (not shown), decode logic (not shown), etc. For embodiments for which the processor 105 is a microprocessor, the other logic 145 may additionally include logic such as, for example, branch processing-related logic 147 and/or other speculative processing-related logic 149. In addition to the aforementioned general-purpose microprocessor circuitry, the processor 105 also includes a cellular automaton prefetch state machine 150 and a cellular automaton (CA) update unit 155, each of which is described in more detail below.

For other embodiments, the processor may include only one level of cache memory or may otherwise be configured in another manner. Also, while an exemplary cache memory is described as being used to implement the CA architecture of one embodiment, for other embodiments, a different type of substantial memory array on the processor, such as, for example, a trace cache memory, translation lookaside buffer(s), etc. may instead be used as a "CA cache." Further, it will be appreciated that, for other embodiments, the system 100 and/or components of the system 100 may include additional elements that are not shown in FIG. 1 or may not include all of the components shown in FIG. 1.

Figure 2:
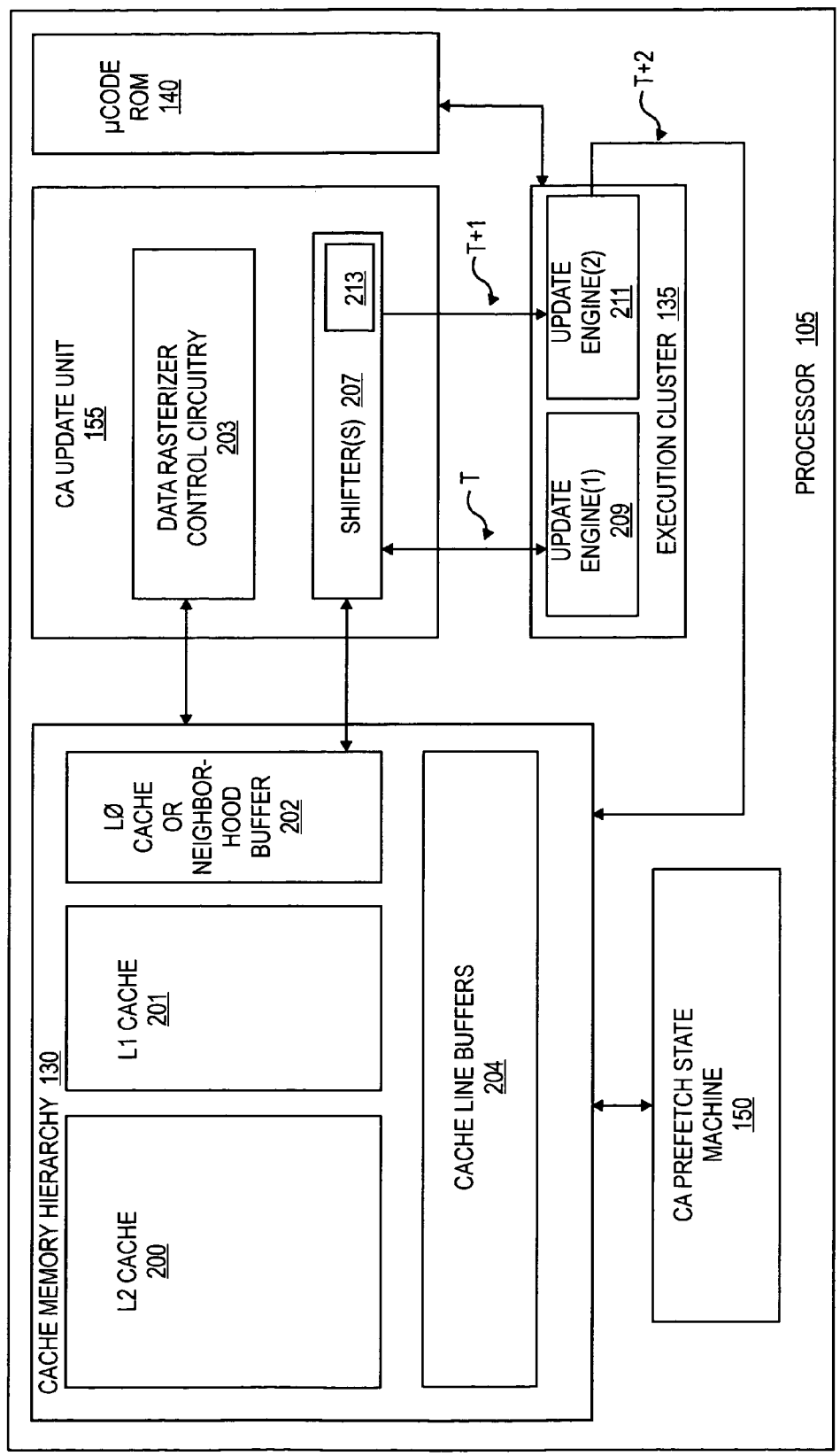
FIG. 2 is a block diagram of a processor of one embodiment that includes a cellular automaton-capable architecture.

FIG. 2 is a block diagram showing some aspects of the processor 105 in additional detail. For the embodiment shown in FIGS. 1 and 2, the cache memory hierarchy 130 includes three levels of cache memory: level 2 (L2) 200, level 1 (L1) 201 and level 0 (L0) 202 as shown. For this exemplary embodiment, the L2 cache memory 200 is the largest and takes the longest to access while the L0 cache memory 202 is the smallest and is associated with the fastest access time. The L1 cache memory 201 lies between the L2 and L0 cache memories in both speed and size. One or more cache line buffer(s) 204 may also be included. The cache memory hierarchy 130 also includes circuitry not shown in FIG. 2 such as, for example, address decoding circuitry and access control circuitry. For other embodiments, a larger or smaller number of cache memories may be included on the processor 105.

The CA prefetch state machine 150, alternately referred to herein as simply a prefetch state machine, is provided to prefetch a sufficient number of cache memory blocks into a neighborhood cache or buffer that is large enough to provide all data need to update a CA cell according to an indicated update rule. The CA prefetch state machine 150 is also capable of shifting the neighborhood such that the update of the next cell in its input data stream can be computed as described in more detail below. For one embodiment, the CA prefetch state machine 150 further includes the capability to write a data stream of CA cells that have been updated back into the cache memory 200 and/or the capability to maintain coherency between various levels of the cache memory hierarchy 130 where applicable.

While the CA prefetch state machine 150 of some embodiments provides for perfect prefetching, i.e. the correct data associated with a given operation is always prefetched, a prefetch state machine that provides the functionality described below, but that does not always perform perfect prefetches is also within the scope of various embodiments.

The CA update unit 155 of one embodiment includes data rasterizer and control circuitry 203, and one or more barrel or other types of shifter(s) 207. The data rasterizer and control circuitry 203 is capable of extracting and unwrapping cache lines into a data stream of CA cells that can be shifted past one or more update engines. The shifter hardware 207 is capable of selecting and presenting relevant data for each cell update to the update engine that is to perform the cell update. The CA update unit 155 of some embodiments may also include additional control circuitry or other logic not shown in FIG. 2.

For one embodiment, the execution cluster 135 includes at least one general-purpose execution unit along with related control and other circuitry (not shown). For the embodiment shown in FIGS. 1 and 2, the execution cluster 135 includes at least two such execution units, which, in the context of the CA cache architecture and methods described herein, are referred to as update engine (1) 209 and update engine (2) 211. For another embodiment, one or more update engines may be implemented using logic other than general-purpose execution units.

The operation of the CA cache architecture and method of various embodiments is now described with reference to FIGS. 1, 2 and 3. An application 160 including a cellular automaton algorithm may be stored on a machine-accessible medium 165 or may otherwise be accessible by the computer system 100. During execution of the application 160, data to be processed by the CA algorithm is loaded into the L2 200 or other cache memory at processing block 305. The data loaded into the cache memory 200 at this point, for purposes of illustration, is the state of the CA data at time T.

The application program 160 may include an instruction to cause the execution of an update rule on a cell of the CA cache memory 200. This instruction may be part of the standard instruction set architecture for the processor 105 and may or may not be exposed to users. Alternatively, this CA update instruction may be supported by a microcode patch written to the microcode ROM 140 or in another manner. Other instructions that may be useful for processing CA-based algorithms such as, for example, instruction(s) to reset update engine(s), point to update rule(s), step the CA, etc., may also be supported by the processor 105 in a similar manner.

During processing of the application 160, when such a CA update instruction is encountered, or when the application 160 otherwise indicates that the CA data is to be updated, at processing block 310, the CA prefetch state machine 150 and data rasterizer control circuitry 203, or other logic, control prefetching and rasterizing data from cache line(s) of the cache memory 200 that include a first cell to be updated and associated neighborhood cells.

Figure 4:
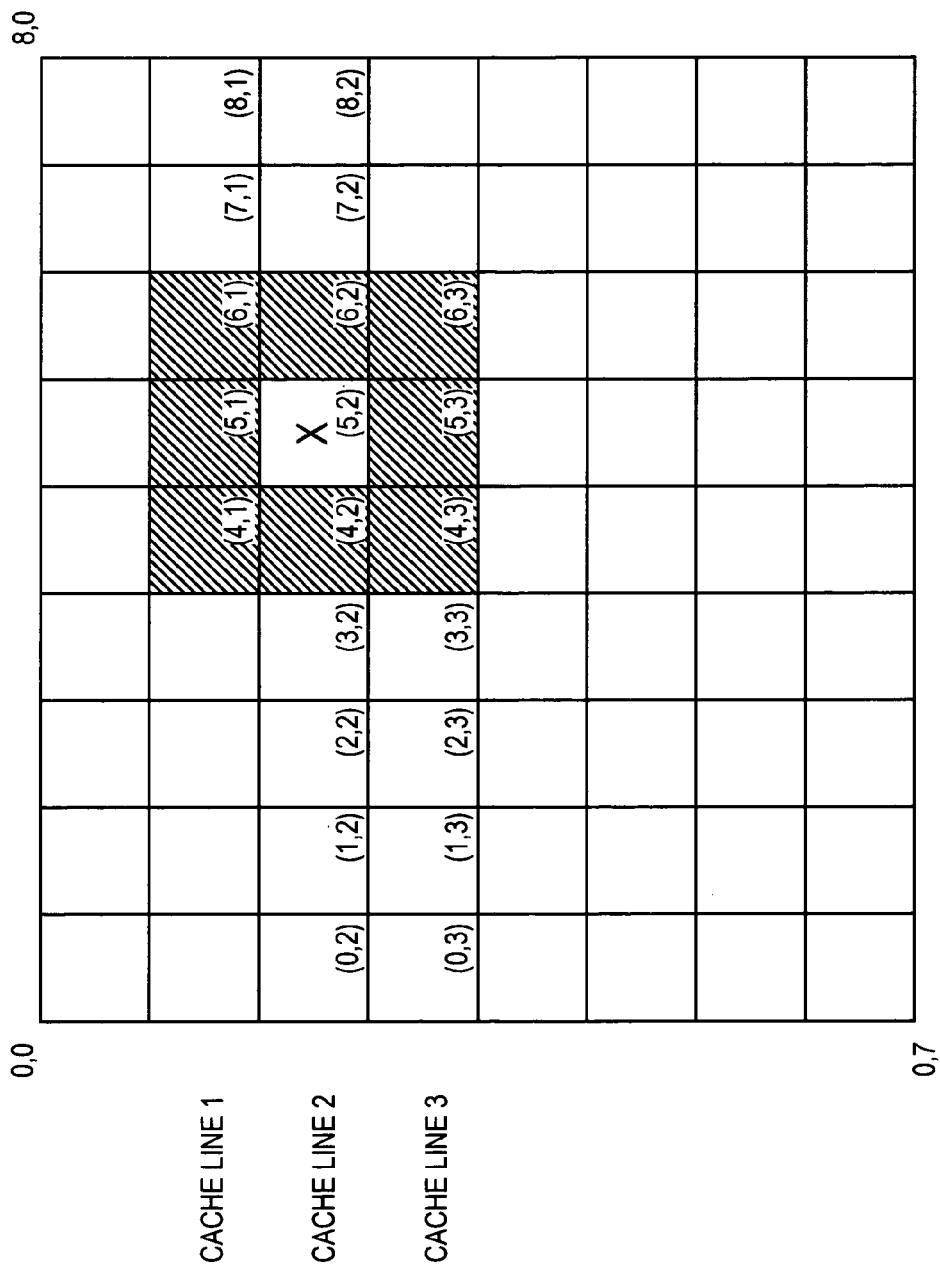
FIG. 4 illustrates a portion of a cellular automaton lattice indicating a cell to be updated and its neighborhood of cells for one embodiment.

FIG. 4 illustrates a portion of the L2 cache memory 200 storing CA data at time T. For this example, each cell of the cellular automaton data includes only one storage location in the cache memory 200. For other embodiments, multiple storage locations may be used to represent a single cell of cellular automaton data.

In FIG. 4, the cells are numbered with their relative X, Y coordinates for purposes of illustration in order to clarify the definition of neighborhood cells as used herein. For this example, the cell to be updated is cell (5,2) identified in FIG. 4 with an X. The neighborhood cells associated with the cell (5,2) for this particular example are defined to be all cells that are adjacent to the cell (5,2). These neighborhood cells are indicated with diagonal hatch marks.

For another embodiment, or for another application that includes a cellular automaton algorithm, the neighborhood cells for some or all cells in the CA may be defined in a different manner relative to the cell to be updated. For example, for a different application, the neighborhood cells for cell (5,2) might be all cells within two cells of the cell (5,2). Other neighborhood definitions may also be used for various embodiments and/or applications that include CAs.

Figure 5:
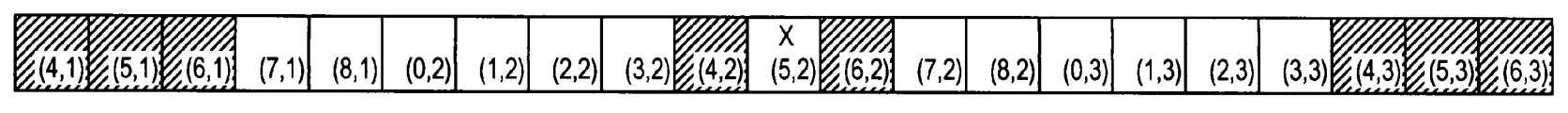

Thus, at processing block 310, using the example of FIG. 4, when the cell (5,2) is to be updated, data from the cache lines 1, 2 and 3 is prefetched by the CA prefetch state machine 150 and rasterized by the data rasterizer and control circuitry 203 into a data stream of cells that can be shifted sequentially past the update engine 209. FIG. 5 illustrates an example of a rasterized portion of the CA data of FIG. 4 including the cell to be updated (5,2) and associated neighborhood cells.

For this example, cells are rasterized in the X direction along the cache lines. For another embodiment, a different rasterization approach may be used. The rasterization approach used for a particular embodiment may depend on the neighborhood definition for a particular application such that the number of cells that are rasterized and available for a particular update is minimized.

For one embodiment, the CA prefetch state machine 150 and data rasterizer and control circuitry 203 prefetch and rasterize a sufficient number of cells such that the string of cells visible to an update engine includes all associated neighborhood cells. In this manner, the neighborhood definitions for typical CA-type applications that are to be run by the processor 105, and the rasterization method used, may help to determine the architectural requirements of the CA update unit 155 in terms of the minimum number of cells that should be visible to an update engine.

Figure 3:
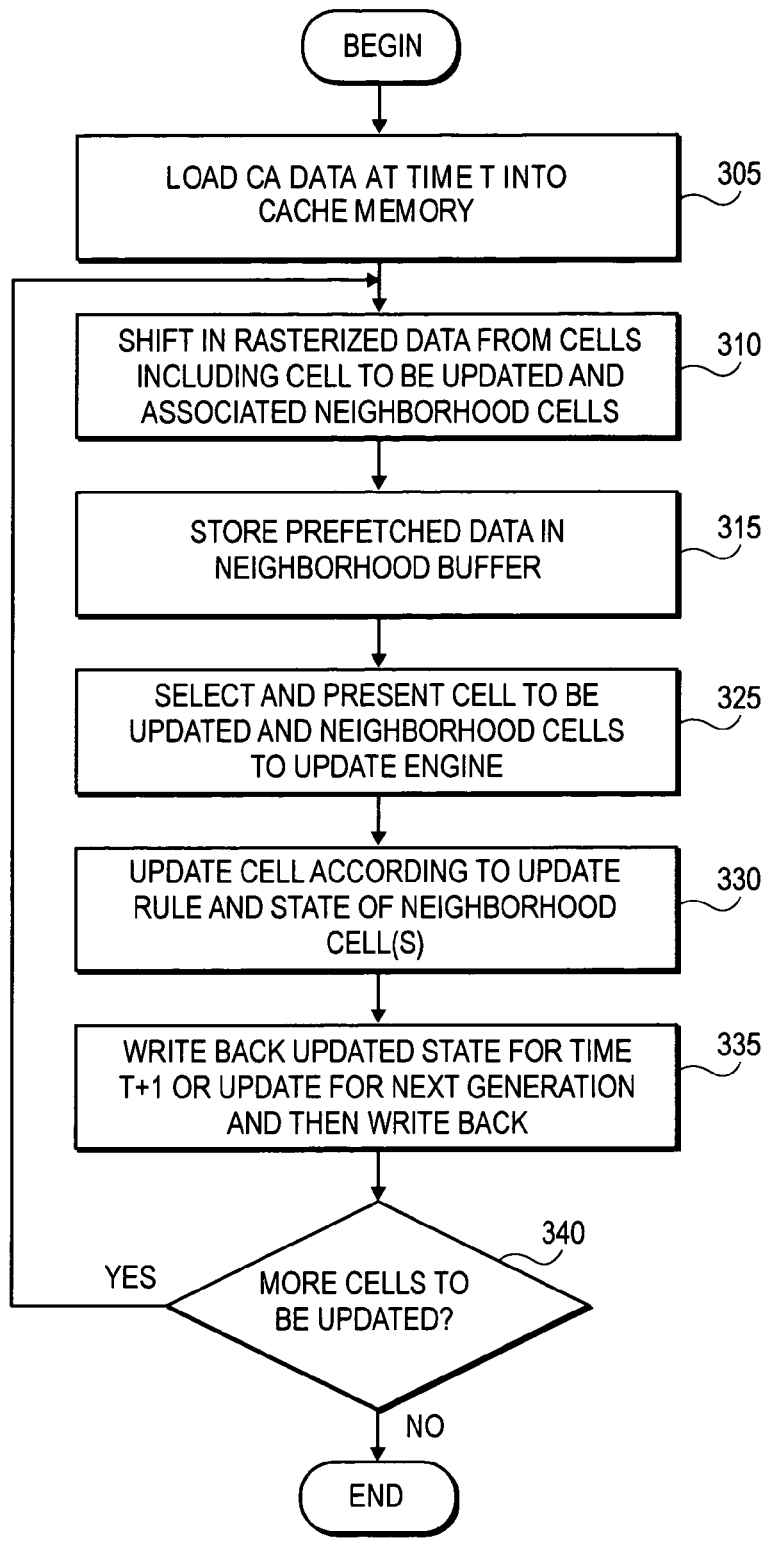
FIG. 3 is a flow diagram illustrating the cellular automaton cache method of one embodiment.

With continuing reference to FIGS. 1, 2 and 3, prefetched CA data is then stored in a neighborhood buffer at processing block 315. For one embodiment, the neighborhood buffer is provided by a lower level cache memory, such as, for example, the L0 cache memory 202 of FIG. 2. For another embodiment, however, the neighborhood buffer may be provided by one or more cache line buffers 204, or by another data store on the processor 105.

At processing block 325, the shifter hardware 207 selects and presents to the first update engine 209 the data from the cell to be updated and associated neighborhood cells. For the CA data illustrated in FIG. 4, for example, the shifter logic 207 selects and presents to the first update engine 209 the cells (4,1) through (6,1) from cache line 1, the cells (4,2) through (6,2) from cache line 2, and the cells (4,3) through (6,3) from cache line 3. For one embodiment, the data associated with these cells is provided in parallel to the update engine 209.

At processing block 330, the cell to be updated is then updated in response to an update rule or set of update rules indicated by the application 160 and in response to the state of the neighborhood cells at time T. Once updated, the cell has a new state at time T+1, where times T, T+1, etc. may be referred to herein as time steps.

At processing block 335, if there is only one update engine in the execution cluster 135 and/or if the CA data is only to be updated once before being written back, the state of the updated cell may be written back to the cache memory by the CA prefetch state machine 150 or other logic at this point. For some embodiments, for potential improvements in efficiency and performance, data associated with updated cells may not be written back until a predetermined number of cells have been updated or until another condition has been satisfied. In other words, write back operations may not be performed one cell at a time. Also for one embodiment, updated cell data is written back strictly in order. For other embodiments, at least some write back operations may be performed out of order.

With continuing reference to processing block 335, if multiple update engines are pipelined, such as the update engines 209 and 211, the updated cell data may be provided back to the shifter(s) 207. The shifter(s) 207 then select and present cells that have been updated and their respective updated neighborhood cells to the second update engine 211 in a similar manner such that a second generation of updates may be performed. This second generation of cell updates executed by the second update engine 211 is also performed according to one or more update rules provided by the application 160 and according to the states of neighborhood cells at the previous time step—time step T+1 in this example.

It will be appreciated that this second update by the second update engine 211 takes place only after the cell to be updated and all of its associated neighborhood cells have been updated by the first update engine 209. Thus, for one embodiment, the shifter(s) 207, or circuitry coupled to the shifter(s) 207 may include an additional data store 213 to hold cells updated by the first update engine 209 until all the neighborhood cells associated with a cell to be updated by the second update engine 211 have been updated by the first update engine 209.

For the embodiment shown in FIG. 2, two update engines 209 and 211 are pipelined as described above such that the state of each cell at time T+2 is provided at an output of the update engine 211. The intermediate state of the CA data at time step T+1 is not written back to the cache memory. In this manner, one pass through the update engine pipeline updates the CA data two generations: one generation for each update engine in the pipeline.

For other embodiments, more update engines may be pipelined such that more generations of updates may be processed before being written back. For many CA algorithms, it is possible to do this because any changes in a CA data propagate outward at a limited rate such that the effects of a change remain local even several generations later. By using multiple pipelined update engines in this manner, some embodiments provide for the concurrent, superscalar updates of several generations of a cellular automaton for improved processing efficiency.

Thus, for processors such as the processor 105, it may be useful to include many more execution units than are currently practical on conventional, general-purpose microprocessors. Because current designs can extract limited parallelism from application instruction/data streams, there is a limit on the number of execution units that can be usefully employed before saturation of the bandwidth to and from the cache memories makes more execution units useless. Because the pipelining described above capitalizes on the very deep parallelism of CA algorithms, more execution units could be usefully employed to increase performance for processors used to run CA algorithms. The pipelining avoids the bandwidth limitation just described and should provide the ability to use more execution units when running so-called embarrassingly parallel applications.

At processing block 340, if there are more cells to be updated, the CA prefetch state machine 150 and data rasterizer and control circuitry 203 continue to prefetch and rasterize data, and the processor 105 continues to update cells in manner described above until all cells in the CA have been updated or until all cells identified to be updated have been updated. Further cell updates for future update generations are synchronously performed in a similar manner as indicated by the application program 160 until a given number of updates have been processed, or until another stop condition is reached.

It will be appreciated that, for some embodiments, various aspects of the CA cache architecture may be implemented in a pipelined manner such that many cells may be in different states of being updated concurrently. Thus, the actions indicated by the flow diagram of FIG. 3 may also take place concurrently for different cells.

It will also be appreciated that, while the hardware of FIGS. 1 and 2 is referenced in the description of the method of FIG. 3 for purposes of illustration, for other embodiments, some or all of the described actions may be performed instead using different hardware and/or software, for example.

Many important and/or widely used applications use strictly local computation suitable for CA implementation. In general, applications that simulate natural systems may contain the embarrassingly parallel algorithms suitable for CA computations. Simulations of hydrodynamics, airflow over wings, plasmas, weather, etc. belong to this class of applications. Local computations of graphics, such as edge enhancement also belong to this class. In addition, some modern encryption algorithms can be effectively implemented as cellular automata.

In accordance with some of the above-described embodiments, the inclusion of special hardware to implement a CA cache architecture within general-purpose microprocessors or other types of processors may improve application performance for some or all of this class of applications. Further, this improvement may be realized with the addition of relatively little hardware in a processor that may be used for other purposes. For some embodiments, this added hardware has little to no impact on the performance of the processor for other types of applications.

Thus, a cellular automaton cache method and apparatus are described. In the foregoing specification, the invention has been described with reference to specific exemplary embodiments thereof. It will, however, be appreciated that various modifications and changes may be made thereto without departing from the broader spirit and scope of the invention as set forth in the appended claims. For example, for some embodiments, multiple update engines may be provided to update multiple cells concurrently for a single time step. For other embodiments, one or more levels of the cache memory described herein, or other logic described as being implemented on the exemplary processor may instead be included on a separate integrated circuit die. Other variations will be appreciated by one of ordinary skill in the art. The specification and drawings are, accordingly, to be regarded in an illustrative rather than a restrictive sense.

What is claimed is:

1. A processor comprising:
   a first memory to store instructions and data for use by the processor, the first memory further to store data representing a first state of a cellular automaton at a first time step, the data to be organized in cells;
   a first update engine, the first update engine including a microprocessor execution unit capable of executing general purpose microprocessor instructions;
   a cellular automaton prefetch state machine to prefetch data from cells to be updated and associated neighborhood cells and store the prefetched data in a neighborhood buffer; and
   a cellular automaton update unit to provide data from the neighborhood buffer to the first update engine,
   the first update engine to update at least some of the selected cells according to an update rule and a state of any associated neighborhood cells to provide a state of the cellular automaton at a second time step, the first memory, the cellular automaton prefetch state machine, the neighborhood buffer, the first update engine and the cellular automaton update unit being integrated on a single micro-processor chip.

2. The processor of claim 1 wherein
   the cellular automaton prefetch state machine is further to write data representing the second state of the cellular automaton back to the first memory.

3. The processor of claim 1 further comprising:
   data rasterizer control circuitry, the data rasterizer control circuitry, together with the cellular automaton prefetch state machine to rasterize prefetched data to be stored in the neighborhood buffer.

4. The processor of claim 1 wherein the first memory comprises a first cache memory and the neighborhood buffer comprises a second cache memory.

5. The processor of claim 1 wherein the neighborhood buffer comprises a cache line buffer.

6. The processor of claim 5 further comprising:
   shifter logic to select from the neighborhood buffer a cell to be updated and associated neighborhood cells, the shifter logic further to present data associated with the selected cells to the update engine.

7. The processor of claim 1 further comprising:
   a second update engine, wherein the first and second update engines are pipelined, the first update engine to update the cellular automaton to provide the second state of the cellular automaton at the second time step, the second update engine to update the second state of the cellular automaton to provide a third state of the cellular automaton at a third time step.

8. The processor of claim 7
   wherein the cellular automaton prefetch state machine is further to write data representing the third state of the cellular automaton back to the first memory.

9. A microprocessor comprising:
   a cache memory hierarchy including at least two levels of cache memory, a first level of the cache memory to store data representing a first state of a cellular automaton at a first time step, the data being organized in cells and a second level of the cache memory to receive prefetched, rasterized cellular automaton data;
   an execution cluster including at least a first execution unit to execute microprocessor instructions; and
   a cellular automaton update unit, the cellular automaton update unit to provide data from the second level of the cache memory to the first execution unit, the first execution unit to update each cell to be updated in the cellular automaton in response to an update rule and in response to a state of any associated neighborhood cells at the first time step to provide a second state of the cellular automaton at a second time step.

10. The microprocessor of claim 9 wherein
    the execution cluster further comprises at least a second execution unit, the first and second execution units being pipelined, the second execution unit to update each cell of the cellular automaton at the second time step to provide a third state of the cellular automaton at a third time step such that the cellular automaton is updated at least twice before associated data is written back to the first level of the cache memory hierarchy.

11. The microprocessor of claim 10 wherein the cellular automaton update unit comprises:
    data rasterizer control circuitry, the data rasterizer control circuitry in conjunction with a prefetch state machine to rasterize data associated with the cellular automaton cells to be provided to the first execution unit, and
    one or more shifters, the one or more shifters to shift the rasterized data past the first execution unit and to shift data associated with the second state of the cellular automaton past the second execution unit.

12. The microprocessor of claim 11 wherein the cellular automaton update unit further comprises:
a data store to store data associated with a cell at the second time step and all associated neighborhood cells until all the associated neighborhood cells have been updated by the first execution engine.

13. The microprocessor of claim 9 further comprising:
a prefetch state machine, the prefetch state machine to prefetch data associated with the cell to be updated and associated neighborhood cells.

14. The microprocessor of claim 13 wherein the cellular automaton update unit comprises:
data rasterizer control circuitry, the data rasterizer control circuitry in conjunction with the prefetch state machine to rasterize prefetched data to be provided to the first execution unit.

15. The microprocessor of claim 14 wherein the cellular automaton update unit further comprises:
one or more shifters to shift the rasterized data stored in the second level cache memory past the first execution unit.

16. The microprocessor of claim 9 further including a microcode read-only memory, the microcode read only memory to include microcode to support at least one cellular automaton-specific operation.

17. A method comprising:
storing data representing a state of a cellular automaton at a first time step in a first memory of a general-purpose processor;
prefetching a portion of the stored data;
rasterizing the portion of the stored data, the portion including at least data associated with a cell to be updated and associated neighborhood cells;
storing the prefetched rasterized data in second neighborhood memory;
updating the cell to be updated according to an update rule and a state of the associated neighborhood cells at the first time step, at least a portion of the updating to be performed by a microprocessor execution unit capable of executing general-purpose microprocessor instructions; and
repeating prefetching, rasterizing, storing and updating until all cells to be updated have been updated such that a state of a cellular automaton at a second time step is provided, the rasterizing and updating to be performed by circuitry on a same chip as the memory.

18. The method of claim 17 further comprising:
writing back to the memory data representing the updated state of the cellular automaton.

19. The method of claim 18 further comprising:
repeating rasterizing and updating until all cells to be updated have been updated at least twice prior to writing back to the memory.

20. A system comprising:
a bus to communicate information;
a device coupled to the bus to enable access to a medium storing an application including a cellular automaton; and
a micro-processor capable of executing general-purpose instructions coupled to the bus to execute the application, the micro-processor including:
a memory to store data representing a state of the cellular automaton at a first time step, the data being organized in cells,
a cellular automaton prefetch state machine to control prefetching of data to be provided to the execution unit and wherein,
the memory is a first on-chip cache memory, the processor further including a second on-chip cache memory to store the prefetched data,
an execution cluster including a first execution unit, the first execution unit capable of executing at least some general-purpose microprocessor instructions; and
a cellular automaton update unit to provide data associated with cells of the cellular automaton to the first execution unit the first execution unit to update each cell to be updated in the cellular automaton in response to an update rule and in response to a state of any associated neighborhood cells at the first time step to provide a second state of the cellular automaton at a second time step.

21. The system of claim 20 wherein
the device is a mass storage unit.

22. The system of claim 20 wherein
the device is a network connection device.

23. The system of claim 20 wherein the cellular automaton prefetch state machine is further to write data representing the state of the cellular automaton at the second time step back to the memory.

24. The system of claim 20 wherein the memory is an on-processor cache memory.

25. The system of claim 20 wherein the processor further includes
a second execution unit pipelined with the first execution unit, the second execution unit to update each cell to be updated in the second state of the cellular automaton to provide a third state of the cellular automaton at a third time step before an updated state is written back to the memory.

* * * * *